Sept. 26, 1972     A. M. PURCELL ETAL     3,694,246
METHOD OF USING DISPLAY DEVICE UTILIZING
POLYMER-POLYMER MISCIBILITIES
Filed June 24, 1969
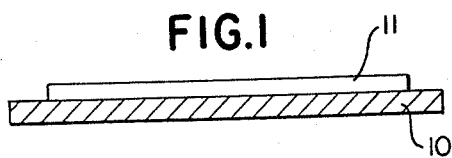
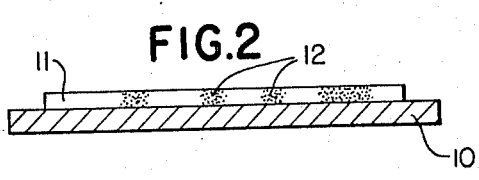
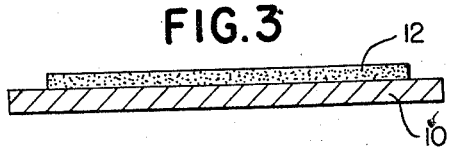
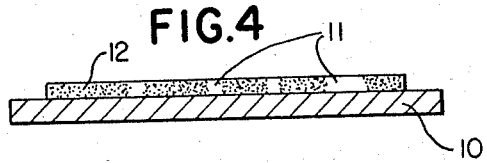
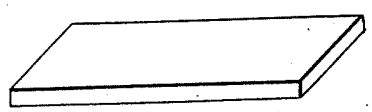
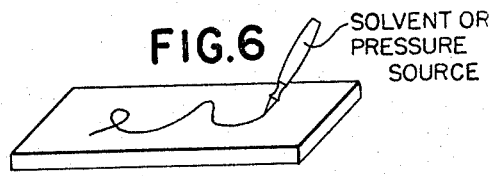
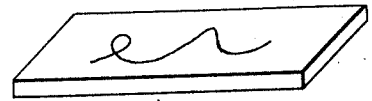
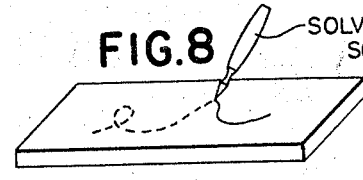
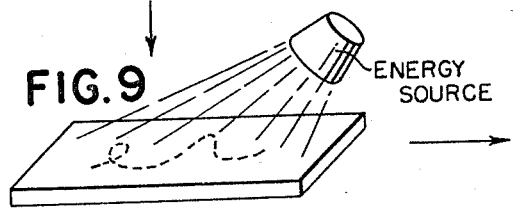
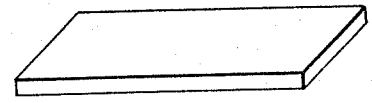
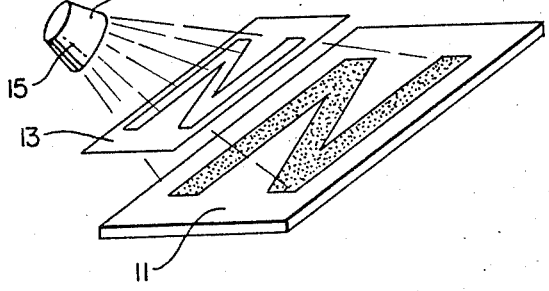
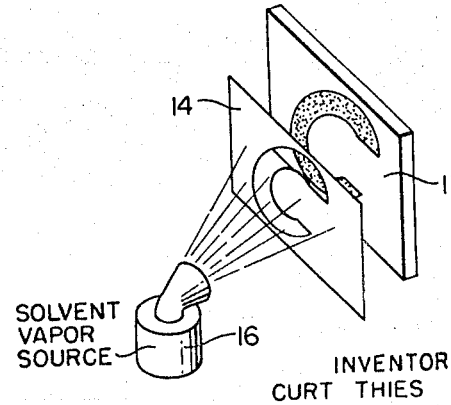
INVENTORS
CURT THIES
MORRIS I. BANK
JAMES W. LEFFINGWELL
ANTOINETTE M. PURCELL

3,694,246
METHOD OF USING DISPLAY DEVICE UTILIZING POLYMER-POLYMER MISCIBILITIES

Antoinette M. Purcell, Cranbury, N.J., and Curt Thies, Morris I. Bank, and James W. Leffingwell, Dayton, Ohio, assignors to The National Cash Register Company, Dayton, Ohio Filed June 24, 1969, Ser. No. 836,021
Int. Cl. B41m 5/18
U.S. Cl. 117—36.7
7 Claims

ABSTRACT OF THE DISCLOSURE

A display device is disclosed which comprises a film, coating, or body either supported or unsupported, of a combination of at least two polymeric film-forming materials. The eligible polymeric materials can exist in one of two solid states, either being mutually miscible or being mutually immiscible. In the state of immiscibility, the polymeric materials, when cast, form a hazy body; while, in the miscible state, a cast body is substantially transparent. Imaging is achieved, in a body of initially hazy material, by converting the body to a transparent conformation in the image pattern and; in a body of transparent material, imaging is accomplished by causing a haze to form, that is, by causing the polymers to become immiscible in the image pattern. The change from miscibility to immiscibility and vice versa, in films of the display device of this invention, can be accomplished by any of several means, such as by contacting the films with appropriate solvents, changing or subjecting the films to temperature gradients in the proper ranges, or subjecting the films to pressure gradients such as by writing with a stylus.

BACKGROUND OF THE INVENTION

Field of the invention

This invention pertains to an imaging or display device wherein a film, coating or body comprising a combination of at least two polymeric materials is utilized as an image-receiving surface. The polymeric materials are carefully selected to be ones which, when cast together from liquid solution in one certain solvent system and dried, exhibit apparent mutual miscibility and yield a transparent polymeric solid solution; and, when cast together from liquid solution, in another certain solvent system and dried, exhibit apparent mutual immiscibility and yield a hazy, translucent or opalescent polymeric solid which contains an intimate mixture of microscopic domains of the separated polymeric materials. For purposes of the disclosure of this invention, it should be noted that physical properties of polymeric solids vary grossly with temperature, depending upon the glass transition temperature and the melting temperature of the polymeric material involved (that is, if the polymeric materials crystallize in the solid state). There are references made throughout this disclosure to certain phase separation or critical temperatures which cause various combinations of polymers to become either translucent or clear. In the cases of those references, it may be true that the polymeric solid is actually a polymeric melt at the time of becoming either translucent or clear. It should be understood that the occurrence of such polymeric melts is treated, in this disclosure, as a polymeric solid as the melts exist below their glass transition temperatures. Further, it is believed that the term—glass transition temperature—is well-known to those skilled in the art and that no explanation of the term is necessary.

In one embodiment of the present invention, manufacture of an image is accomplished by applying an "incompatibilizing solvent" to a solid solution of polymeric materials. In the reverse of that embodiment, the image is made by writing on a hazy film of the mutually immiscible polymeric materials, using a "compatibilizing solvent." The imaging device of this invention has, as its imaging screen, combinations of polymeric materials in the form of films, coatings, sheets, bodies or in any other convenient attitude or structural form. For convenience of verbal description, the imaging device of this invention will be referred to hereinafter as a film or body, but it should be understood that such terms do not limit the breadth to which the device of this invention can be applied.

In a second embodiment, manufacture of an image is accomplished by applying a temperature gradient to a solid body of the polymeric materials. In the instance where the body is a substantially transparent solid solution, then the temperature gradient will be chosen to cause a phase separation of the particular polymeric materials used and thereby to cause the body to develop a haziness. In the instance where the polymeric materials in the display device body are initially immiscible or hazy in the background, then the temperature gradient will be applied so that the polymeric materials will become mutually miscible or will dissolve in one another, thereby forming a substantially transparent image contrasting from the hazy background.

The invention also pertains to manufacture of an image by applying a pressure gradient to a body of the eligible polymeric materials wherein the pressure gradient causes a phase transition of the same kind as that caused by solvents and temperature gradients mentioned above.

Another feature of the invention resides in provision of a device useful in diffusing radiant energy, either in an image pattern or not. As a radiant-energy-diffusing device, eligible polymeric materials are combined, either in liquid or solid, substantially transparent solution, in such a manner that, after absorbing enough radiant energy to heat the relatively radiant-energy-transmitting device to a phase transition temperature, the device becomes hazy and relatively radiant-energy-diffusing.

Several eligible polymer pairs are disclosed herein, along with appropriate "incompatibilizing" and "compatibilizing" solvents for use in making images on bodies of the combined polymeric materials. Also disclosed herein are several polymer pairs which are imaged and used in display and diffusing devices by application of temperatures or pressure gradients, or by other phase transition stimuli.

Description of the prior art

U.S. patent application No. 836,148, filed June 24, 1969 in the name of Antoinette W. Purcell, one of the inventors herein, and assigned to the assignee herein, disclosed and claimed a method for encapsulation by use of several of the combinations of the polymeric materials useful in the display device of this invention, now U.S. Pat. 3,640,-892. The polymeric materials disclosed in the above-mentioned patent application, however, are useful in encapsulation processes by virtue of their being capable of undergoing liquid-liquid phase separation in liquid capsule manufacturing vehicles by means of changing the temperature of the manufacturing vehicles. The encapsulation process of that patent application is novel in that the liquid-liquid phase separation occurs by elevating or increasing the temperature of the encapsulating system; the polymeric components becoming compatible or mutually miscible if the temperature of the system is lowered. That patent application in the name of Purcell, although it teaches the use of some of the polymeric pairs in this patent application, does not teach the manufacture or use of display devices, using dried solid films of polymeric material pairs or any other of the embodiments of the present invention.

Chapter XIII of "Principles of Polymer Chemistry" written by T. J. Flory and published by the Cornell University Press, Ithaca, N.Y. (1953), contains an extensive discussion of polymer-polymer compatibility phenomena, as occur both in liquid systems and in solid systems. There is no hint in the above-cited reference by Flory of the reversible, miscible-immiscible, character of solid films of polymeric materials as are used and as are eligible for use in the present invention.

The fundamental concept and preferred embodiments important to the practice of the subject invention includes altering mutual miscibility in solid systems of combined polymer pairs by: changing the kinds of solvent in the initial system; establishing temperature gradients; or applying pressure to display devices of the films. It is believed that this broad concept is completely new, not published in the prior art, and is therefore not known in the technical literature.

SUMMARY OF THE INVENTION

In the past, that is in literature of the prior art, it has been generally reported that chemically different polymeric materials are mutually immiscible in both solid and liquid solution, except in very low concentrations. Moreover, if a pair of polymeric materials were found to be miscible, then miscibility was generally considered to be the rule for that pair of polymeric materials in all solvents. Films cast from solutions of miscible polymeric materials in a particular solvent, would generally be substantially transparent in the solid film. Dried films of a pair or more of chemically different polymeric materials which were immiscible in a liquid or solid system and which had significantly different indices of refraction would be expected to be hazy and would be expected to remain hazy under all conditions. It has now been discovered, however, that certain polymeric material pairs which are miscible or which form miscible solutions using some solvents, form immiscible solutions using other solvents. Some polymeric material systems have also been discovered which undergo liquid-liquid phase separation, in a liquid solution, as a function of rise in temperature. Those pairs of polymeric materials which have been found to undergo liquid-liquid phase separation with a rise in temperature, have also been found, in some cases, to undergo a phase separation with change in temperature when cast as, solid, polymeric material films, either supported or not. Phase separation or phase transition required by the display device of this invention generally occurs with an increase in temperature, that is, a dried film of the display device material passes from a transparent state into a hazy state with an increase in film temperature. The novel display devices consist, in the preferred embodiments, of films or bodies of polymeric materials on which an image can be produced by causing the polymeric materials to exist in combination in one of two different states. The discovery of this invention has permitted an image to be formed by writing with a solvent, with temperature, and, in some cases, with a stylus on a sheet or coating of the polymeric film material.

An object of this invention is to provide a display device utilizing sheets, films or coatings of a combination of two or more selected polymeric materials which, in solid solution combination, can be reversibly converted by an imaging stimulus from a mutually miscible condition to a mutually immiscible condition and vice versa.

More specifically, an object of this invention is to provide a display device characterized by an imaging body comprising an intimate combination of two or more polymeric materials capable of being reversibly converted from a mutually miscible to a mutually immiscible state and vice versa. Such conversion is accomplished by application of an appropriate "compatibilizing" or "incompatibilizing" solvent as may be required or desired for recording an image.

Another object of the present invention is to provide such a display device as mentioned above, with the exception that the polymeric materials which form the imaging body of the device are capable of exhibiting reversible phase separation by use of a temperature gradient as a phase transition stimulus.

Another object of the invention, as will be more specifically disclosed hereinbelow, is to provide indicating display devices which yield either a temporary or a permanent indication of temperature change, pressure change or contact with certain organic solvents.

Another object of the invention, as will be more specifically disclosed hereinbelow, is to provide a display device which, while maintaining a primary imaging and display capability, also exhibits a capability of serving as a secondary display in that it forms a screen for projection of light images from a remote source.

Another object of the invention, as will be more specifically disclosed hereinbelow, is to provide a radiant-energy-diffusing body which body contains a solid or liquid solution of the polymeric materials of the present invention such that radiant energy is transmitted through the body until a certain critical temperature is reached; and beyond which critical temperature the solution undergoes a phase transition and thereafter absorbs an increased amount of the previously-transmitted radiant energy. Of course, the body also finds use as a display device in the instance where radiant energy is provided in the pattern of an intended data image.

Other, similar and diverse, objects of the present invention will become apparent to those skilled in the art with understanding of the disclosure hereinbelow and of the claims appended hereto.

A feature which is considered to be novel in the claimed display devices of this invention are the imaging screens of the various embodiments which screens present a surface onto which characters or markings can be placed. These screens can be made of coatings, films, bodies or slices of the combined polymeric materials and can be initially hazy or transparent, thick or thin, self-supporting, or backed by a substrate, lighted or not, and if lighted, from the back or from the front, colored or not, or they can be cast onto a colored substrate which makes the films of the display device themselves appear to be colored.

Other features which are considered to be novel in the claimed display devices of the present invention are the temporary and permanent indicating films, and the radiant-energy-diffusing cells, either liquid or solid, all of which have been referred to hereinabove and will be more specifically disclosed and claimed below.

The method for making bodies useful in the display devices of this invention comprises preparation of a solution, in an appropriate solvent, of all of the polymeric materials which are to be included in the dried body. A solution, once prepared, is then cast onto a substrate or onto a material which will be releasable from the body once the body is dried. Solvent is driven from the cast solution and the body of polymeric materials is ready for imaging, either as it is, coated on the substrate, or as an unsupported film to be applied to any other imaging device or to be used alone as a screen, if such is desired or required for a particular purpose. A film, once prepared from appropriate, eligible, polymeric materials and utilizing the appropriate solvent material can be imaged by applying to the film, in the desired pattern or along the intended data trace, a writing of the solvent which will cause the polymeric materials of the film to become immisciblized if they are originally miscible or misciblized if they are originally immiscible. When the writing solvent has evaporated, the imaged trace will remain as a written pattern.

It has also been found that films of the present invention can be imaged by subjecting the films to pressure gradients, such as by writing with a stylus. In the case of initially transparent films, the stylus pressure appears to cause a phase separation of the polymeric materials within the film materials. The reasons for imaging to occur with the films of the present invention under pressure gradients or stresses accomplished by the pressures of the stylus are not well understood. The present films can also be imaged by applying temperature gradients to the films, thus causing, with an initially transparent film, an immiscible or hazy image; and, with the case of an initially hazy film, a miscible or substantially transparent image. The means for imaging by use of a temperature gradient include sources such as a hot type font, a heated stylus, or a focused energy beam. This thermally-induced phase transition in order to yield a translucent or opalescent image is, in some instances, reversible and such films return to a substantially transparent condition upon cooling below a certain phase-transition temperature.

It should be understood, of course, that the bodies of this invention, whether previously or initially imaged or not, can be subjected to a combination of imaging stimulae. For example, an image which has been accomplished by applying solvent to the body, can be erased by applying a temperature gradient to the body. Many images are reversible and images made by applying a temperature gradient to a film can, in many cases, be erased by applying a compatibilizing solvent. Images made by pressure gradients can be almost completely erased by either a solvent application or a temperature gradient application.

It should also be understood that images placed on the films of this invention can be graduated as to density. That is, a transparent film subjected to a gradual temperature gradient over a distance will yield an image which extends from transparent to hazy through a gradual range or change of the increasing immiscibility. The same can be said for a film which is being or has been imaged by solvent vapors; the difference between background on the film and image on the film being a function of exposure of the solvent vapor to the film itself. In some systems, however, a threshold level of imaging stimulus must be achieved before the imaging is commenced and in those instances, the graduated image density is, to that extent, not realized. The gradual development of an image on film of this invention is also a function of exposure time; the image density gradient increasing with exposure time for a given intensity of imaging stimulus.

Differential radiant energy diffusing devices can be prepared from the polymerc materials eligible for use according to this invention. The energy diffusing devices contain a combination of polymeric materials which become mutually immiscible at a temperature or at an intensity of transition stimulus at which it is desired to maintain or begin control of such stimulus. At that point, a formerly transparent device begins to become hazy or translucent, thus absorbing energy and thereby reducing transmission of energy above the threshold intensity. Such an arrangement can be used in a temperature-controlled light absorber or light-controlled heat absorber, wherein the controlling transition stimulus is of an energy-type different from the energy to be controlled.

Data storage systems on cards or pages of films of the polymeric materials appropriate for such a use are easily prepared, wherein printing on the film can be accomplished by either a solvent pen or a heat pen and the cards, once used and if no longer useful, can be restored to the original, unprinted, conformation and used again. Data, once applied to such cards, if the cards are prepared with the polymeric materials preferred for such use, is substantially tamper-proof, because the data once applied to the film, becomes a part of the film by virtue of the phase separation of polymeric material which occurs throughout the thickness of the film.

Of course, films in large sheets or pages made by using polymers disclosed herein can be used as convenient temporary displays or screens to be written on or imaged continuously with a continual follow-up array, such as a news disseminating means or as a chart means useful in conducting programs.

It should be understood that the kind or type of display device is not the controlling factor in the invention contained herein. The imaging portion—the face or screen of the display device—is what is fundamental and new and a most important feature of the invention. That face of the display device can be applied or attached to any appropriate desired apparatus, or used alone, in order to accomplish the required results. Such a display device that utilizes a body of combined polymeric materials, as described in this invention, is novel and its performance is tied to the concept of mutually miscible and mutually immiscible combinations of polymeric materials as they exist in polymeric solid and liquid solutions; it being required, in the most preferred embodiments, that the phase transitions be reversible by a transition stimulus such as appropriate solvents, temperature gradient or pressure gradient.

The reason for polymeric materials to be either mutually miscible or mutually immiscible when in solid combination with other polymeric materials is not well understood, and, therefore, selection of polymeric materials eligible for use in this invention cannot be easily accomplished without some experimentation. The experimentation required for screening materials which are useful together in films of this invention is, however, not difficult and can be accomplished without excess laboratory effort. The experimentation simply involves, in most cases, a combination of solvents and polymeric materials into a single system and casting of that system onto a substrate. Drying of the film by evaporation of the solvent is then all that is required to determine if the polymeric materials are either miscible or immiscible in the solid state as a cast film. The film, once cast, can be subjected to solvents of various kinds and temperature gradients of various degrees in order to determine if phase separation can be accomplished.

The miscibility behavior of seevral representative but specific polymeric materials pairs which have been cast onto films from various solvents is summarized in the table below:

| Solvent | Effect of solvents as they relate to mutual miscibility of several polymer pairs in films (24° C.) | | | |
| --- | --- | --- | --- | --- |
| | Parlon S-20 [1] and Elvax 40, 210, or 250 [2] | Isotactic poly- (vinyl- methyl ether) and Partlon S-20 [1] | Ethyl- cellulose and isotactic poly- (vinyl- methyl- ether) | Elvax 210 [2] and Parlon P-20 [3] |
| Benzene | M | I | I | |
| Toluene | M | I | | M |
| Carbon tetrachloride | M | I | | I |
| Methylene chloride | I | I | M | I |
| Trichloroethylene | I | I | M | I |
| Tetrachloroethane | I | I | | I |
| Chloroform | I | I | | I |
| Ethylmethylketone | | I | M | |
| Methylisobutylketone | M | | | |

[1] "Parlon S-20" is the trade name for a chlorinated rubber (67 percent by weight, chlorine) sold by Hercules Powder Company, Wilmington, Del.
[2] "Elvax 40, 210 or 250" are trade names for poly(ethylene-covinylacetate) materials, sold by E. I. du Pont de Nemours and Company, Wilmington, Del., United States of America and identified herein below.
[3] "Parlon P-20" is the trade name for a chlorinated polypropylene (having 67 percent, by weight, chlorine and a viscosity of 20 centipoises in 20 percent, by weight, solution in toluene at 25° centigrade) sold by Hercules Powder Company, Wilmington, Del.

In the above table, "M" means miscible polymeric pairs and "I" means immiscible polymeric pairs. All of the films contain 1-to-1, by weight, ratios of the polymers involved; but of course, the miscibility phenomena of this invention are not limited thereto. For example, systems can be used wherein one of the polymeric materials constitutes as little as 1 or 2 percent, by weight, of the whole amount of polymeric materials. Systems are commonly used wherein only 5 to 10 percent, by weight, of the whole amount of the polymeric material is a single one of the pair of polymers.

In writing on a substantially transparent film prepared according to the procedure outlined in this patent, the writing solvent is believed to rapidly penetrate the interfacial region of the coating or self-supporting film and swell or partially solubilize the film. If the solvent is sufficiently volatile, it evaporates rapidly, leaving a dry surface behind. Less volatile solvents, of course, require longer evaporation periods but, nevertheless, ultimately leave dry surfaces. In any case, when a film from this invention is contacted with either kind of solvent, even briefly or temporarily, the film is believed to be solubilized or swollen to some extent and a phase separation is believed to be induced in the coating or film. Such phase separation of the polymer materials results in an image, that is, results in turbidity or opalescence in the film in all areas or regions where the coating has been exposed to the solvent material. The image is formed rapidly requiring very little solvent material.

It should be noted that one method of this invention for making images, yields images which are distinctly visible on an otherwise substantially transparent film. Such images are formed without the aid of a dye, pigmented ink, chemical reaction or thermally-induced chemical change in the properties of the film. All that is utilized in the preferred embodiment is the physico-chemical properties of certain polymeric pairs in the presence of solvents, namely, properties causing the polymer pairs to form turbid or translucent coatings when cast with certain solvents, due to their mutual immiscibility in those solvents under certain conditions. From other solvents the same polymeric materials may form substantially transparent coatings and it is because of these above-discussed mutual miscibility phenomena that the imaging display device can be used to provide a unique copying and reproducing system. As above-stated, the images which are formed are stable, do not rub off, and, indeed, they are an integral part of the coating; existing, in most instances, throughout the thickness of the film.

BRIEF DESCRIPTION OF THE DRAWINGS

Turning now to the drawings which form a part of this patent, there are FIGS. 1 through 12 and it should be understood that various features of imaging and erasing and a few embodiments of display devices are depicted in these figures, along with depiction of the imaging bodies themselves which are a combination of polymeric materials as described herein. The body, which is either a homogenous solid solution of the polymeric materials or a two phase system of phase-separated polymeric materials, is difficult to depict accurately in drawings and is, therefore, shown only in schematic representations. The indicated steps for the process of manufacturing and erasing images and the depicted embodiments for imaging devices are also shown schematically in order to better disclose the concept of using the display device.

FIG. 1 depicts a film or coating of the invention 11 applied to a substrate 10. The film 11, although in cross-section, is indicated without hatching in an attempt to depict that the film is substantially transparent as a solid solution, rather than having any image placed thereon. The substrate is in cross-section also, and it should be understood that the film could also have been shown as being self-supporting.

In FIG. 2, the film 11 and substrate 10 are repeated but in FIG. 2 there are hazy areas 12 which represent a cross-sectional view of images; applied to the coating by one of the mechanisms described in the body of this patent.

FIG. 3 indicates another embodiment of the coated film of this invention. The coated film in this FIG. 3 initially is cast as a hazy film. For that reason, the film is identified by the numeral 12 as is the hazy portion of the film in FIG. 2. The film of FIG. 3 is optionally depicted as being cast on substrate 10.

FIG. 4 represents the film of FIG. 3 except that there have been transparentized images formed into film 12. Those images are represented in FIG. 4 by the portions of the film indicated with the numeral 11. In FIG. 4, the film is also cast onto substrate 10 but it should be remembered that all of these films in FIGS. 1 through 4 can be self-supporting and that the substrate forms no part of the invention claimed herein. Also, the films of these figures, either in self-supporting form or not, can be used as screen for receiving projected images.

FIGS. 5 to 10 depict a step-by-step process for imaging and erasing the image of an originally substantially transparent film of the present invention. FIG. 5 represents schematically the initial unmarked transparent film. FIG. 6 is a simple representation intended to show application of either marking or "incompatibilizing" solvent or a pressure trace to the transparent sheet in order to make a mark. FIG. 7 represents the sheet after imaging has been accomplished. FIG. 8 depicts, in a film having reversibility, one method of erasing the image once it is formed on the sheet. The erasing solvent which is utilized in the drawing of FIG. 8 is a "compatibilizing" solvent which permits the hazy combination of phase separated polymeric materials to become redissolved and mutually miscible in one another and become, therefore, substantially transparent. FIG. 9 depicts another embodiment of the erasing step which may be utilized on a film of this invention having reversibility. An infrared source or other energy source is shown in FIG. 9 in order to depict the application of a temperature gradient to the marked or imaged film. FIG. 10 is intended to depict the same film as FIG. 5, that is, the film has gone through an imaging step and then an erasing step by either of the two embodiments shown in the above FIG. 8 or 9. FIGS. 5 to 10 depict the process of imaging and erasing to indicate the complete reversibility of an imaging device prepared according to this invention. In films wherein reversibility is not a characteristic of the film, images cannot be effectively erased.

FIG. 11 depicts an embodiment of the display device, utilizing an infrared or other energy source 15 as a means for creating a temperature gradient on an initially substantially transparent polymeric film 11 of this invention. In this embodiment, a heat mask or shield 13 is provided so that heat is permitted to pass the shield in a conformation desired for imaging on the polymeric film 11. The film 11 of this FIG. 11 could also be a transparent-walled cell containing a liquid solution of polymeric materials separable, by temperature change, into a hazy condition.

FIG. 12 depicts another embodiment of a display device utilizing the polymeric film of this invention; in this case, initially transparent and upon marking, becoming hazy. In FIG. 12, a mask 14 is provided in a closely spaced position to film 11 or a transparent-walled cell so that it shields the film from solvent vapors provided by solvent source 16—a part of the display device depicted by FIG. 12. Vapors emanating from solvent source 16 can pass holes in mask 14 and come in contact with film 11, thereby causing an intended data image to be provided in film 11.

It should be understood that mask 13 depicted in FIG. 11 can also be a page of printing juxtaposed on film 11, wherein the infrared or energy source 15 would provide energy to letters of the juxtaposed page, which letters, in turn, would be heated, thereby providing stimulus for imaging onto film 11. A proper exposure of energy thereby causes reproductions of the page into the display device film.

It should be understood that in each of the FIGS. 11 and 12 and in any of the previous figures, the original conformation of the display device film could have been hazy or incompatibilized so that images made on the film would have been made by causing the imaged areas to become transparent.

DESCRIPTION OF PREFERRED EMBODIMENTS

Example I

In this example a coated film was cast from a solution of a combination of polymeric materials onto a glass substrate. The polymeric materials were provided as follows: chlorinated rubber having about 67 percent, by weight, chlorine and a number average molecular weight of about 52,000 (sold under the trade name of "Parlon S–20" by Hercules Powder Company, Wilmington, Del., U.S.A.) and isotactic poly(vinylmethylether) (PVME) having an inherent viscosity of 1.9 to 2.7 as determined in 0.1 percent, by weight, benzene solution (sold under the trade designation of "WS–100" by General Aniline and Film Corporation, New York, N.Y., U.S.A.), were provided as solutions using methylisobutyl ketone (MIBK) and having a concentration of 5 percent, by weight, of each polymeric material. The polymeric materials were provided in solution at a 1-to-1 weight ratio; the total solids concentration, therefore, being 10 percent, by weight. The solution was cast onto the glass substrate in a film, at a temperature of 24 degrees centigrade. The MIBK was evaporated and the resulting film was a transparent coating. Imaging was provided on films of this combination of polymeric materials by writing with all of the following solvents alone or in combination: methylene chloride, chloroform, or trichloroethylene. Images, once formed by using the above mentioned solvents, could be erased by contacting the images with MIBK.

This same example can be repeated using, instead of MIBK, any of the above-named writing solvents, methylene chloride, chloroform or trichloroethylene, to prepare solutions from which to cast films. The resulting film is, in that case, hazy and imaging can be provided by writing with methyl isobutyl ketone to yield transparent areas on the, initially hazy, background. Erasing then, of course, can be performed by using any of the solvents, methylene chloride, chloroform or trichloroethylene.

Example II

In this example, a solution was provided of chlorinated rubber as described in Example I as the first polymeric material and poly(ethylene-covinyl acetate) having 27–29 percent, by weight, vinyl acetate, a melt index of 400 and a number average molecular weight of about 12,800 (sold under the trade name of "Elvax 210" by E. I. du Pont de Nemours and Company, Wilmington, Del., U.S.A.) as the second polymeric material. The polymeric materials were provided in solution in a one-to-one, by weight, ratio and the concentration of each material in solution was 5 percent, by weight. The solvent used for providing the solution in this example was toluene. The solution was cast, as in Example I, onto a glass substrate at a temperature of about 24 degrees centigrade and the toluene was evaporated to leave a substantially transparent coating of the solid solution combination of polymeric materials. Images were formed on this clear coating using again as in Example I methylene chloride, chloroform and trichloroethylene. Also, as in Example I, the procedure for casting can be reversed so that the film is originally hazy; and, in that case, imaging is provided by the use of toluene and the image is a transparent or clear area on the hazy film.

Example III

In this example, the same chlorinated rubber as that of the previous examples was used as a first polymeric material and poly(methyl methacrylate) having a weight average molecular weight of about 1,900,000 (PMMA) was used as a second polymeric material. The two polymeric materials were dissolved in toluene as a solvent, again in a one-to-one, by weight, ratio; the concentration of each in solution being 5 percent, by weight. This solution was cast onto a substrate, the toluene evaporated and the resulting clear or transparent film was imaged by writing with methylene chloride and chloroform. The compatibilizing and incompatibilizing solvents used in this example can also be reversed as they have been in the previous examples.

Example IV

In this example the same chlorinated rubber was used as a first polymeric material and, as a second polymeric material, poly(ethylene-co-vinylacetate) (above-identified as "Elvax 210") were dissolved in toluene as a solvent and were cast this time onto a thin film of poly(ethylene terephthalate) rather than onto a rigid glass substrate. The weight ratios of polymeric materials were identical with the previous examples. The images obtained and the coating obtained were also identical to previous examples. The cast film can be stripped from the substrate and used unsupported.

Example V

In this example, three polymeric material pairs were provided in solutions of toluene. The polymeric materials had a one-to-one, by weight, ratio in solution. Each polymeric material had a concentration of 10 percent, by weight, in the toluene system. The three polymeric material pairs were cast onto an aluminum substrate to yield transparent films and on all three films, the writing solvent was chloroform. Erasing of images made could be accomplished by the use of toluene. The three polymeric material pairs were:

(a) Poly(vinylmethylether) as a first polymeric material and polystyrene having a weight average molecular weight of about 246,000 as a second polymeric material.
(b) Chlorinated rubber (above-identified as "Parlon S–20") and poly(methylmethacrylate).
(c) Chlorinated polypropylene as hereinabove identified and poly(ethylene-co-vinylacetate) having 27–29 percent, by weight, vinyl acetate, and a melt index of 12–18 (sold by E. I. du Pont de Nemours, Wilmington, Del., U.S.A., under the trade name of ("Elvax 250").

Example VI

In this example, temperature gradients are utilized to form images on a film of this invention. In this example, the solution of polymeric materials is similar to that of Example II. The polymeric materials are chlorinated rubber ("Parlon S–20") and poly(ethylene-co-vinylacetate) ("Elvax 210"). The polymeric materials are provided in solution in a one-to-one, by weight, ratio and the concentration of each in solution is 5 percent, by weight, in toluene. Films from the solution, when cast on a substrate, dry optically clear and are substantially identical with the films of Example II. A film of this material was cast onto a glass substrate and dried. The dried film was then heated to a temperature of between 150 to 200 degrees centigrade. The heating caused the pair of solid polymeric materials to develop a hazy or translucent appearance. The heated and hazy film was cooled quickly and the translucence persisted. The translucent film can be written on with a compatibilizing solvent, such as toluene, to make a transparent image or trace.

Another method for utilizing temperature gradients to form images on display device films of this invention, is to write on a film such as the one described above in this Example VI, using a heated stylus or a type font heated to a temperature of, as in this example, 150 to 200 degrees centigrade. Such writing with a heated stylus causes translucence on the optically clear or transparent film. In such a case the translucent image can be erased with a compatibilizing solvent. It should be noted that the transparent imaging can also be erased by an increase in temperature in order to cause phase separation to recur.

Example VII

In this example, the procedures for forming images and erasing images were repeated identically with Example VI, above. The polymeric materials used, however, were poly(styrene) and isotactic poly(vinylmethylether). The poly(styrene) had a, weight average, molecular weight of 246,000. The isotactic poly(vinylmethylether) had an inherent viscosity of 1.9 to 2.7 as measured in a 0.1 percent, by weight, benzene solution (sold under the trademark designation "WS–100" by General Aniline and Film Corporation, New York, N.Y., U.S.A). Concentrations of polymeric material in toluene were 5 percent, by weight, each, as in Example VI above. By heating the cast, clear, film, translucence can be accomplished and subsequent writing is then possible using compatibilizing solvents. Imaging by use of a heated stylus or type font is also possible and gives results substantially identical with the results of Example VI, above. A translucent film produced in the above example can be used, as previously described, in manufacture of a secondary display or screen for receiving projected light images from a remote source. The above example prescribes a 1-to-1, by weight, ratio of the two polymeric materials but, of course, ratios differing from that can be used; and different ratios provide different degrees of translucence in the films. For example, a ratio of 5-to-95 percent, by weight, poly(vinylmethylether)-to-poly(styrene) yields an almost transparent film, as does a ratio of 95-to-5 percent at the other extreme. It has been found that a ratio of about 40-to-60 percent, by weight, poly(vinylmethylether)-to-poly(styrene) of the above description yields a film of the least transparence.

Example VIII

The solution of this example consisted of 5 percent, by weight, each, of polymeric materials, above identified, isotactic poly(vinylmethylether) and chlorinated rubber—that is, "WS–100" and "Parlon S–20," respectively. The solvent used in this example was methylisobutyl ketone. Techniques and results in using the solutions in this example were substantially identical with Examples VI and VII, above. Ethyl cellulose can be substituted for the chlorinated rubber of this example with substantially equivalent results with respect to temperature-dependent translucence.

Example IX

The solution of this example consisted of 5 percent, by weight, concentrations, each, in toluene of the above-identified chlorinated rubber ("Parlon S–20") and a poly (ethylene-co-vinylacetate) having 39–42 percent, by weight, vinylacetate and a melt index of about 55 (sold under the trade name of "Elvax 40" by E. I. du Pont de Nemours and Company, Wilmington, Del., U.S.A.). As in the three previous examples, films cast onto a substrate using this solution were clear when the solvent was evaporated; but unlike films of the three previous examples, the haze or translucency, which occurs on heating the film, is reversible and disappears when the temperature of the film is reduced. Films using the solution from this example, then, are useful as a temporary display of increased temperatures or are useful for imaging by application of increased temperatures in the form of a type font or stylus which remains in contact for the duration of the desired imaging.

For all combinations of polymeric materials disclosed above, excepting the combination in this Example IX, rapid cooling of a film after heating of the film yields a non-reversing translucence. It should be understood, however, that rapid cooling is herein defined as a cooling rate in the order of 50 to 100 degrees centigrade per minute. If any of the above-disclosed films are cooled at a much slower rate—for example, at about 5 centigrade degrees per minute—they, too, show a largely reversible imaging characteristic with regard to temperature gradients. In some cases, the translucence does not entirely disappear with the slower cooling rate, but in all cases the degree of transparency is increased as the cooling rate is decreased.

Example X(a)

In this example, the film of Example IX, above, is imaged by writing thereon, using a solvent such as chloroform to yield a translucent writing trace. The writing trace is then reversed by heating the imaged film to a temperature of about 200 degrees centigrade to make the entire film translucent, and then by cooling to erase the translucency. Such steps result in a film of renewed optical transparency.

Example X(b)

In this example, a film was prepared, by casting a solution of the appropriate polymeric materials in toluene, which film consisted of about 40 percent, by weight, isotactic poly(vinylmethylether) and about 60 percent, by weight, poly(styrene). The film, initially transparent, was made hazy by heating for a short period of time to a temperature of about 120 degrees centigrade. The, now translucent, film was then placed in the infrared beam of an infrared spectrophotometer (Model 457, Perkin-Elmer, Norwalk, Conn., U.S.A.). The infrared energy exposure from the spectrophotometer beam caused a phase transition to occur and the film became transparent again in the exposed areas.

In a modification of the above Example X(b), the hazy film can be completely transparentized again by placing it in an oven at a temperature of about 50 to 90 degrees centigrade for a period of several hours, such as overnight.

Example XI

In this example, the polymeric materials were the above-identified "Elvax–40" and "Parlon S–20" in concentration of 5 percent, by weight, each, dissolved in carbon tetrachloride. The solution was cast onto a substrate of glass and, when the carbon tetrachloride was evaporated, an optically transparent film resulted. The film was covered by a piece of ordinary bond paper and data to be recorded on the cast film was written on the bond paper using a stylus. This pressure gradient caused translucence of the image at the points of application of the stylus to form a writing trace. The cast film was used as a record medium for duplicating and storing the data applied to the overlying sheet of paper. Data on the cast film can be erased by heating the cast film for a few seconds and then cooling. It should be remembered that the heating step causes the entire film to become translucent as was disclosed in Example IX above. Cooling, of course, causes the reversal of the translucence and the final film is transparent.

Hereinbelow are tabulated some of the polymeric material pairs eligible for use in the practice of the present invention:

(1) Chlorinated rubber in combination with any of the following—urea-formaldehyde resin, melamine-formaldehyde resin, alkyd resin, acrylic resin, styrene resin, phenolic resin, coumarone-indene resin, rosin-derived alkyd resin, acrylic ester resin, butadience-acrylonitrile copolymer, dewaxed dammar, pentaerythritol ester of rosin, phenolic-derived resins, non-drying alkyds, chlorinated paraffin, chlorinated biphenyl resins, and acrylic ester resin.

(2) Polymeric materials which can be used with isotactic poly(vinylmethylether) include: acrylonitrile rubbers, polyethylene, poly(vinylchloride), poly(vinylacetate-co-vinylchloride), cellulose acetate, shellac, poly(methylmethacrylate), epoxy resin, poly(urethane), and polyvinylacetate).

Also to be listed among polymer pairs eligible for use in practicing the present invention include poly(vinyl-isobutyl ether) to be used with: butyl rubber, chlorinated rubber, natural rubber, poly(isobutylene), ethyl cellulose, alkyd resins, poly(terpene) resins, and alkylphenol-formaldehyde resin.

The above examples illustrate a few of the numerous combinations of polymer pairs and writing solvents which may be used to form images by the process described herein. They are non-limiting examples in that any polymer pair which exhibits solvent dependent miscibility and immiscibility characteristics such as, for instance, those listed in Table I, previously provided, should meet the criteria for satisfactory image formation by the use of solvents whether from a transparent or from a translucent "initial film."

What is claimed is:

1. A process for manufacturing an imaged display device film of at least two polymeric materials wherein at least one of the polymeric materials undergoes a phase separation with respect to the others to yield a mutually immiscible translucent image on the application of a phase separation stimulus comprising the steps of:
   (a) dissolving the mutually miscible polymeric materials in an evaporable liquid organic solvent to yield a substantially transparent film-forming solution;
   (b) casting the solution;
   (c) evaporating the liquid organic solvent to yield a body of polymeric material in a homogeneous, substantially transparent, solid solution state; and
   (d) applying a phase separation stimulus to the cast solid body, said stimulus operating in a pattern of the image to be recorded and displayed and said stimulus causing a phase separation in the area of the intended image pattern to yield a translucent image.

2. The process of claim 1 wherein the phase separation stimulus is an incompatibilizing solvent applied to the cast solid body in the transparent state.

3. The process of claim 1 wherein the phase separation stimulus is a temperature gradient applied to the polymeric materials in a substantially transparent state to yield data in a translucent state.

4. A process for recording an image on a solid body comprising a substantially transparent solid solution of two mutually miscible polymeric materials wherein at least one of the polymeric materials can undergo a phase separation with respect to the other polymeric material to yield a mutually immiscible translucent image in the areas of phase separation comprising the step of applying a phase separation stimulus to the body of polymeric materials in a pattern of the image to be recorded, said stimulus causing a phase separation and consequent translucence in the area of the image pattern.

5. The process of claim 4 wherein the phase separation stimulus is an incompatibilizing solvent applied to the body of polymeric materials in a substantially transparent state.

6. The process of claim 4 wherein the phase separation stimulus is a temperature gradient applied to the polymeric materials in a substantially transparent state to yield data in a translucent state.

7. A process for diffusing radiant energy, at a certain critical temperature and above, comprising the steps of:
   (a) positioning a body of substantially transparent homogeneous, relatively radiant-energy-transmitting solution, either solid or liquid, including a combination of at least two polymeric materials at least two of which become mutually immiscible and undergo phase separation to become translucent at a certain critical temperature and above, in the path of radiant energy to be diffused; and
   (b) maintaining the position of the body of solution for a time sufficient for the relatively radiant-energy-transmitting solution to absorb energy in an amount to raise the temperature of the body to the critical temperature and thereby cause the body to undergo phase separation and become translucent and relatively radiant-energy-diffusing.

References Cited
UNITED STATES PATENTS

| | | | |
|---|---|---|---|
| 2,962,382 | 11/1960 | Ives | 117—36.7 |
| 3,014,301 | 12/1961 | Grupe | 117—36.7 |
| 3,181,965 | 5/1965 | Michelotti | 117—36.7 |
| 3,228,785 | 1/1966 | Growald et al. | 117—36.7 |
| 3,240,932 | 3/1966 | Haines | 117—36.7 |
| 3,320,089 | 5/1967 | Bourgeous | 117—36.7 |

MURRAY KATZ, Primary Examiner

U.S. Cl. X.R.

117—63, 138.8 F; 250—65 T; 260—884, 886, 899; 264—1

UNITED STATES PATENT OFFICE
CERTIFICATE OF CORRECTION

Patent No. 3,694,246  Dated September 26, 1972

Inventor(s) ANTOINETTE M. PURCELL ET AL.

It is certified that error appears in the above-identified patent and that said Letters Patent are hereby corrected as shown below:

Claim 3, line 2, "a temperature gradient" should be ---heat---.

Claim 6, line 2, "a temperature gradient" should be ---heat---.

Signed and sealed this 13th day of February 1973.

(SEAL)
Attest:

EDWARD M. FLETCHER, JR.
Attesting Officer

ROBERT GOTTSCHALK
Commissioner of Patents

X-1191-67  2-13-70  NCR